(12) United States Patent
Tomczyk (10) Patent No.: US 10,666,935 B2
(45) Date of Patent: May 26, 2020

(54) METHOD FOR PARALLEL DETECTION OF DISPARITIES IN A HIGH RESOLUTION VIDEO

(71) Applicant: Advanced Digital Broadcast S.A., Eysins (CH)

(72) Inventor: Bartosz Tomczyk, Zielona Gora (PL)

(73) Assignee: Advanced Digital Broadcast S.A., Eysins (CH)

( * ) Notice: Subject to any disclaimer, the term of this patent is extended or adjusted under 35 U.S.C. 154(b) by 0 days.

(21) Appl. No.: 16/202,143

(22) Filed: Nov. 28, 2018

(65) Prior Publication Data

US 2019/0166362 A1    May 30, 2019

(30) Foreign Application Priority Data

Nov. 30, 2017 (EP) ..................................... 17461636

(51) Int. Cl.

| | |
|---|---|
| *H04N 17/04* | (2006.01) |
| *G06T 7/136* | (2017.01) |
| *G06T 5/30* | (2006.01) |
| *G06K 9/00* | (2006.01) |
| *H04H 60/32* | (2008.01) |
| *H04N 21/442* | (2011.01) |

(Continued)

(52) U.S. Cl.
CPC ............. *H04N 17/04* (2013.01); *G06F 9/46* (2013.01); *G06K 9/00711* (2013.01); *G06T 5/30* (2013.01); *G06T 7/136* (2017.01); *H04H 60/32* (2013.01); *H04N 21/442* (2013.01); *G06T 7/13* (2017.01); *G06T 2207/10016* (2013.01); *G06T 2207/20132* (2013.01)

(58) Field of Classification Search
CPC ........... H04N 17/04; G06T 7/136; G06T 7/13; G06T 5/30; G06T 2207/10016; G06T 2207/20132; G06K 9/00711
USPC .................................. 725/107, 120; 348/180
See application file for complete search history.

(56) References Cited

U.S. PATENT DOCUMENTS

| | | | |
|---|---|---|---|
| 2011/0072306 A1* | 3/2011 | Racey ................... | G06F 11/273 714/27 |
| 2011/0227934 A1 | 9/2011 | Sharp | |

(Continued)

FOREIGN PATENT DOCUMENTS

CA        2740662 A1    11/2012

*Primary Examiner* — Jefferey F Harold
*Assistant Examiner* — Omer Khalid
(74) *Attorney, Agent, or Firm* — Mark M. Friedman (57) ABSTRACT

A computer-implemented method for parallel detection of disparities in video from multiple customer devices under test in a system unit that comprises a central processing unit and is connected to a graphics card with a graphics processing unit, the method comprising: receiving a video signal from each of the devices under test; processing each of the received video signals in a dedicated CPU thread controlled by the CPU and a dedicated GPU thread controlled by the graphics processing unit; wherein within the CPU thread successive threads are uploaded to a memory for the graphics processing unit and the GPU thread is executed to process the frame, and the processed frames are collected from the memory for the graphics processing unit to check within the CPU thread whether disparities have occurred in the processed frame; wherein all the CPU threads are controlled by a main thread controlled by the CPU.

6 Claims, 10 Drawing Sheets

(51) Int. Cl.
 *G06F 9/46* (2006.01)
 *G06T 7/13* (2017.01)

(56) References Cited

U.S. PATENT DOCUMENTS

| | | |
|---|---|---|
| 2013/0103341 A1 | 4/2013 | Partee |
| 2013/0182072 A1* | 7/2013 | Seo .................... H04N 13/128 |
| | | 348/43 |
| 2014/0002617 A1 | 1/2014 | Zhang et al. |
| 2017/0089981 A1 | 3/2017 | Kumar et al. |
| 2017/0236246 A1* | 8/2017 | Mrozek ................ G06F 9/5027 |
| | | 345/522 |
| 2017/0302994 A1* | 10/2017 | Kumar ................ H04L 41/0253 |

* cited by examiner

METHOD FOR PARALLEL DETECTION OF DISPARITIES IN A HIGH RESOLUTION VIDEO

TECHNICAL FIELD

The present disclosure relates to parallel detection of disparities in a high resolution video from multiple devices.

BACKGROUND

Customer devices, like digital television Set Top Boxes (STBs) often comprise a plurality of tuners such as satellite, cable, terrestrial or IPTV tuners which receive content to be displayed at the television screen or another display device to which the STB is directly connected. It is important that the video quality level offered by the STB is a high quality video which is smooth, fluent and without glitch or delays. The high quality of the video is achieved by proper decoding of the signal which is obtained by bugless software and application of dedicated hardware. However, it is still necessary to check whether any kind of malfunctionality or programming errors exist in the device. Therefore, the devices need to be tested in order to check the quality of the output video signal and a proper functioning of the device.

Currently, such testing is performed by a testing person (the tester), who observes the video signal displayed by the device under the test, which is very time consuming and not reliable (prone to human errors—incapability of observing short or small video disparities).

There are also known methods wherein a video signal from the tested device is captured and analysed by means of algorithms run on computers. However only a single device at one time can be analysed by means of such methods.

Therefore, there is a need to provide a method for parallel detection of disparities in high resolution video, which aims at simultaneous testing of several devices using a single analysing system.

SUMMARY

There is disclosed a computer-implemented method for parallel detection of disparities in video from multiple customer devices under test in a system unit that comprises a central processing unit and is connected to a graphics card with a graphics processing unit, the method comprising: receiving a video signal from each of the devices under test; processing each of the received video signals in a dedicated CPU thread controlled by the central processing unit and a dedicated GPU thread controlled by the graphics processing unit; wherein within the CPU thread successive threads are uploaded to a memory for the graphics processing unit and the GPU thread is executed to process the frame, and the processed frames are collected from the memory for the graphics processing unit to check within the CPU thread whether disparities have occurred in the processed frame; wherein all the CPU threads are controlled by a main thread controlled by the central processing unit.

The method may further comprise loading a configuration from a local storage and initializing a main thread; checking if the configuration has changed and if so, reloading parameters; initializing the dedicated CPU thread for the device under test and creating buffers; loading successive image frames from the video signal of the device under test; uploading last (det_frames) frames to the memory for the graphics processing unit; initializing the dedicated GPU thread and creating buffers; processing the uploaded frames by the GPU thread; downloading a resulting image from the memory for the graphics processing unit; performing image operations within the CPU thread in order to detect video disparities.

The loading of image frames may comprise the steps of: checking if a new frame is available and if not, waiting one frame time and returning to step, and if so, adding the frame to a DUT queue; checking if a minimum of (det_frames) frames are present in the DUT queue and if not, returning to step, and if so, checking if a maximum number (max_frames) frames is reached in the DUT queue and if so, removing the oldest frames, and if not, terminating the process.

The processing of the uploaded frames at the GPU may comprise the steps of: converting (det_frames) to gray-scale images; creating a difference image from the gray-scaled images; performing a binary thresholding image segmentation; performing a binary dilation and erosion algorithms.

Performing the image operations may comprise the steps of: checking if a motion area is specified if so, cropping the motion area from an image, and if not, finding all vector contours represented by non-black colors on the resulting image; checking if the selected area contains more contours than specified by (contours_thresh), and if so, storing an indication that a disparity was found, and if not, storing an indication that the disparity was not found; checking if a disparity state has changed and if so, resetting a counter, and if not, increasing the counter; checking if a number of sequential disparity occurrences represented by the counter is bigger than the specified (disparity_inf) number, and if so, creating an event with information of disparities and sending the event to an events handler, and if not, terminating the process.

There is also disclosed a computer-implemented system for parallel detection of disparities in video from multiple customer devices under test, the system comprising a system unit that comprises a central processing unit and is connected to a graphics card with a graphics processing unit and memory, wherein the system is configured to perform the steps of the method as described herein.

There is also disclosed a computer program comprising program code means for performing all the steps of the computer-implemented method as described herein when said program is run on a computer, as well as a computer readable medium storing computer-executable instructions performing all the steps of the computer-implemented method as described herein when executed on a computer.

BRIEF DESCRIPTION OF DRAWINGS

The method presented herein is presented by means of example embodiments on a drawing, wherein.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

In the present disclosure, the term "video content" is to be understood more broadly as multimedia content comprising video data and associated audio data and associated additional data (such as content description, etc.). The term "video content" is used to distinguish the content from other content types, such as still images or raw data (e.g. files).

DETAILED DESCRIPTION

Figure 1A:
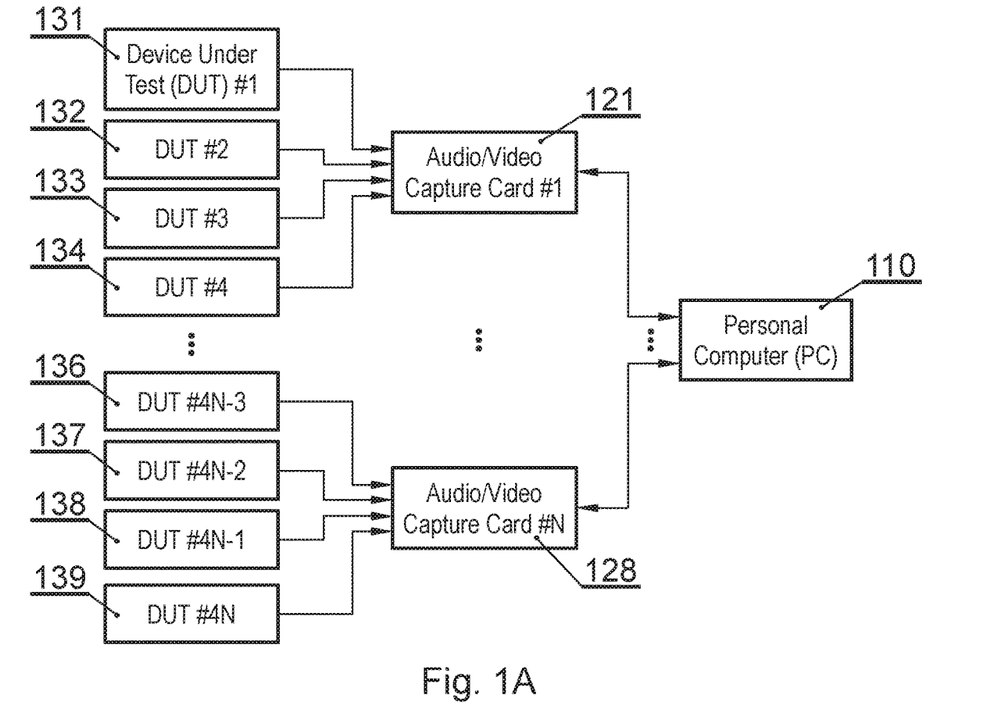
FIG. 1A-1B present an overview of a system for detection of disparities of video from multiple devices under the test.
Figure 1B:
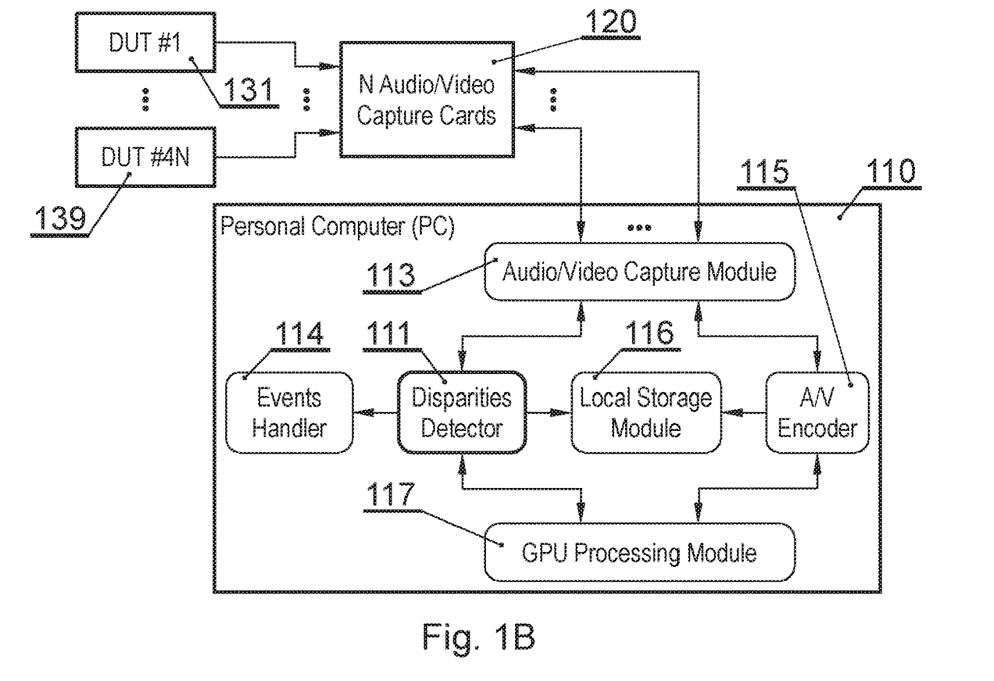

FIG. 1A-1B present an overview of a system for parallel detection of disparities of video from multiple devices under test (DUTs). The system allows to connect different types of audio/video capturing devices 131-139 (DUTs) with a variety of output resolutions. Multiple audio/video devices (DUTs) 131-139 may be connected to a single audio/video capture card, for example the DUTs 131-134 are connected to a first audio/video capture card 121, while the DUTs 136-139 are connected to a second audio/video capture card 128. The system may comprise a plurality of audio/video capture cards 120, wherein each audio/video capture card can support a plurality of devices simultaneously (for example, up to 32 devices per card). The audio/video capture cards 120 are responsible for acquiring audio and video signal from the connected capturing devices (such as Set Top Boxes) and passing it to multiple processes which request them. The audio/video capture cards 120 are connected to a Personal Computer (PC) 110 which comprises an audio/video capture module 113 responsible for receiving the signal from the capture cards and for passing the signal to an A/V encoder 115 and to a disparities detector 111. The A/V encoder 115 acquires the audio and video data from the audio/video capture module and stores it using a local storage 116. To achieve proper flow of storing AV data from all capturing devices, a graphical processing module 117 is used for encoding data to a compressed format, such as MPEG-4 Part 10 (H.264) or to MPEG-H Part 2 (H.265). This can reduce data bitrate sent to a local storage, for example to 256 Mbps (for 32 units with 1080p output) and enables recording of all audio/video data from the connected devices simultaneously. The GPU processing module 117 enables parallel computation of image matrices on graphics memory using multiple accelerated processing units. The disparities detector 111 acquires video data from an audio/video capture module 113 and performs a set of operations to detect dynamic changes of video. To follow the speed of incoming video data (from 1 to 60 frames per second), the disparities detector 111 utilizes the GPU processing module 117 to perform most intensive image operation which as a result can determine changes of the video. An indication of detected moving objects is stored using the local storage 116 and passed to an events handler 114. The events handler 114 monitors and waits for an indication of video changes detection sent from the disparities detector 111 and informs a user about the changes.

Figure 2:
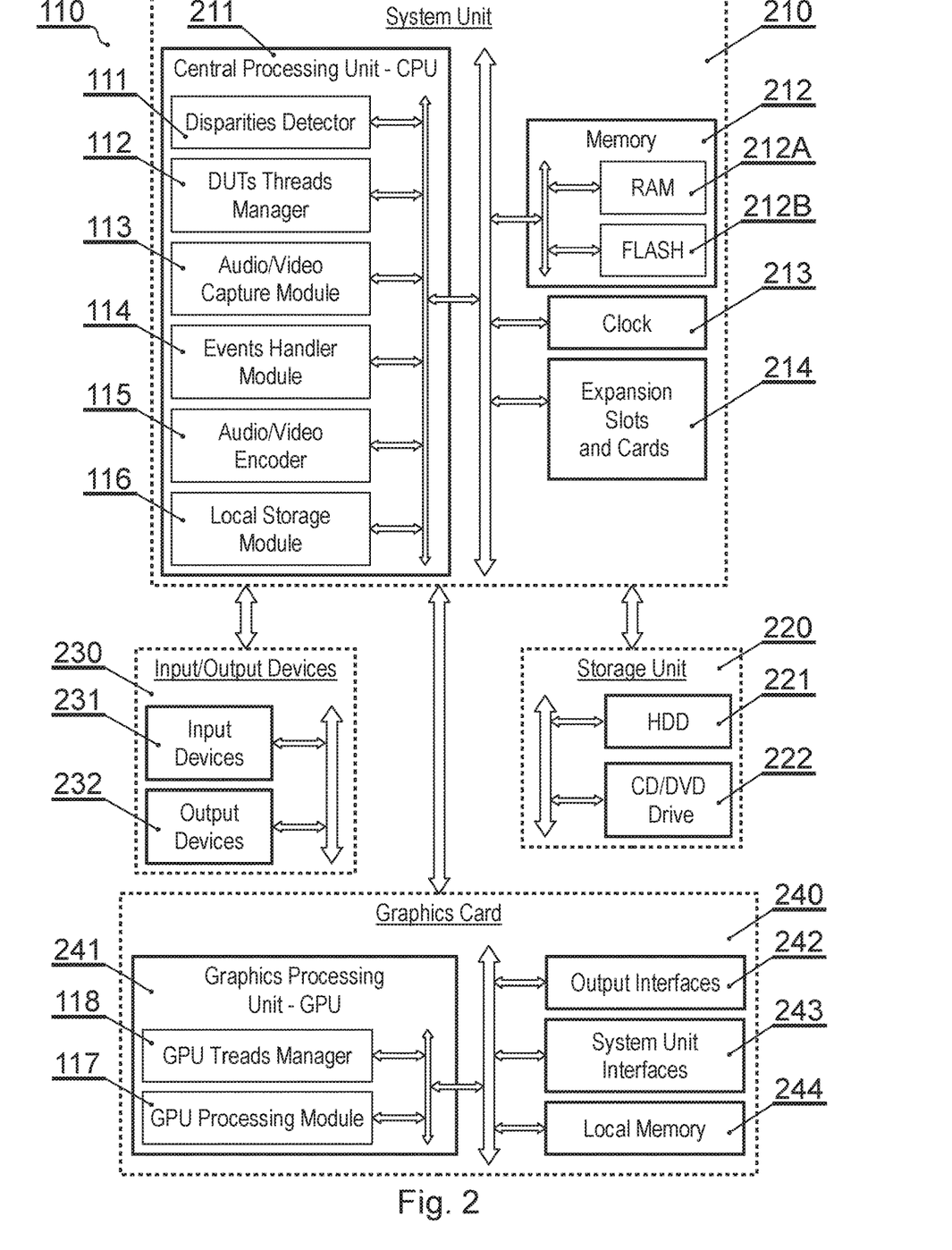
FIG. 2 presents a structure of a personal computer (PC)

FIG. 2 presents a structure of the personal computer 110. The personal computer comprises a system unit 110 which operates utilizing memory blocks 212, including RAM 212A, Flash 212B blocks and utilizes a storage unit 220 with a hard disk drive (HDD) 221 and a CD/DVD Drive 222.

A clock module 213 is configured to provide timing data necessary for cooperation of the system units.

Expansion Slots and Cards 214 provide additional abilities, extensions of the system if necessary.

A Central Processing Unit (CPU) 211 of the PC 110 comprises the disparities detector 111 for detecting dynamic changes of video acquired from the audio/video capture module 113, a DUTs threads manager 112 for managing the threads of the disparities detector 111, the events handler module 114 for monitoring an indication of video changes detection and the audio/video encoder 115 for storing the audio and video data to the local storage module 116.

The personal computer 110 comprises also input/output devices 230, where input devices 231 are for example a keyboard, a mouse, a touchpad and output devices 232 are for example a display, a printer, an IR RCU.

A graphics card 240 of the PC 110 comprises a graphics processing unit (GPU) 241 which has a GPU threads manager 118 and a GPU processing module 117, a local memory unit 244, output interfaces 242 and system unit interfaces 243.

Figure 3:
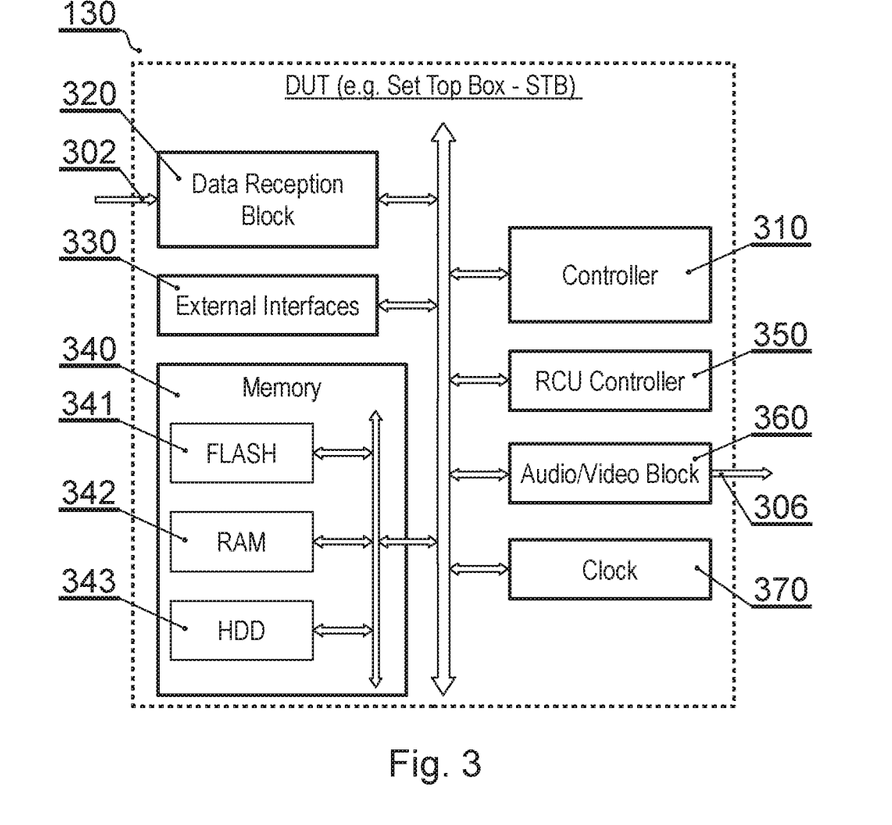
FIG. 3 presents a structure of a Device Under Test (DUT), for example a Set Top Box (STB)

FIG. 3 presents a structure of the Device Under Test 130, for example a Set Top Box (STB).

A controller 310 comprises a plurality of units configured to provide the functionality of the system as described herein.

The STB 130 operates utilizing memory blocks 340, including RAM 342 and Flash 341 blocks and a hard disk drive (HDD) 343 or another type of mass storage that can be used to store video or other data locally at the STB, but is not essential for its operation.

A clock module 370 is configured to provide timing data necessary for cooperation of the device units.

A data reception block 320 is configured to receive downstream data 302, such as video content, from the broadcasting distribution network. The data reception block 320 (also called a front-end block) may comprise a plurality of tuners (such as satellite, cable, terrestrial or IPTV tuners), wherein one of the tuners receives content to be displayed at the television screen to which the STB is directly connected (e.g. the STB 130 connected to the TV set) and another tuner receives the content to be recorded at the HDD 343.

External interfaces 330, such as the Ethernet interface, are configured to communicate, via at least one transmission channel, with the Ethernet (IP) network or the wireless network, in order to receive applications and/or content data, as well as to transmit user or STB statistic data.

The STB is operable by the user via a remote control unit (RCU) that communicates, typically via an IR receiver, with a RCU controller block 350.

An audio/video block 360 is an example of a content presentation block and configured to decode the received content, convert it to an audio/video format suitable for presentation to the user, and transmit the converted content via a transmission channel 306 to a TV set to which the STB is directly connected.

All modules of the STB communicate with each other via one or more internal data buses.

Figure 4A:
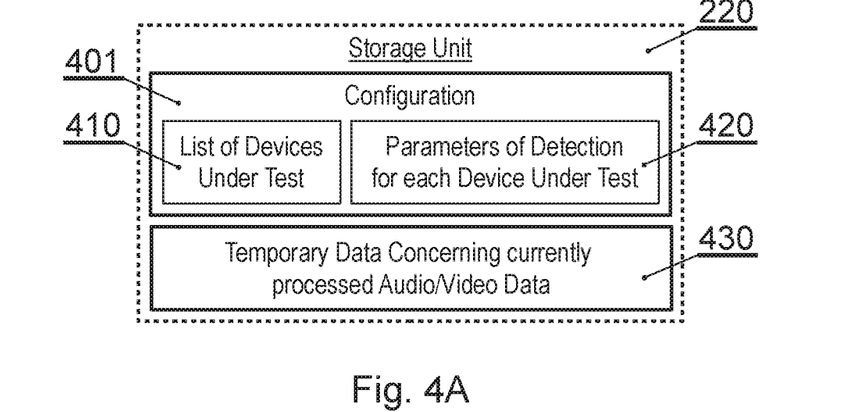
FIG. 4A, 4B present data stored in a storage unit of the personal computer.
Figure 4B:
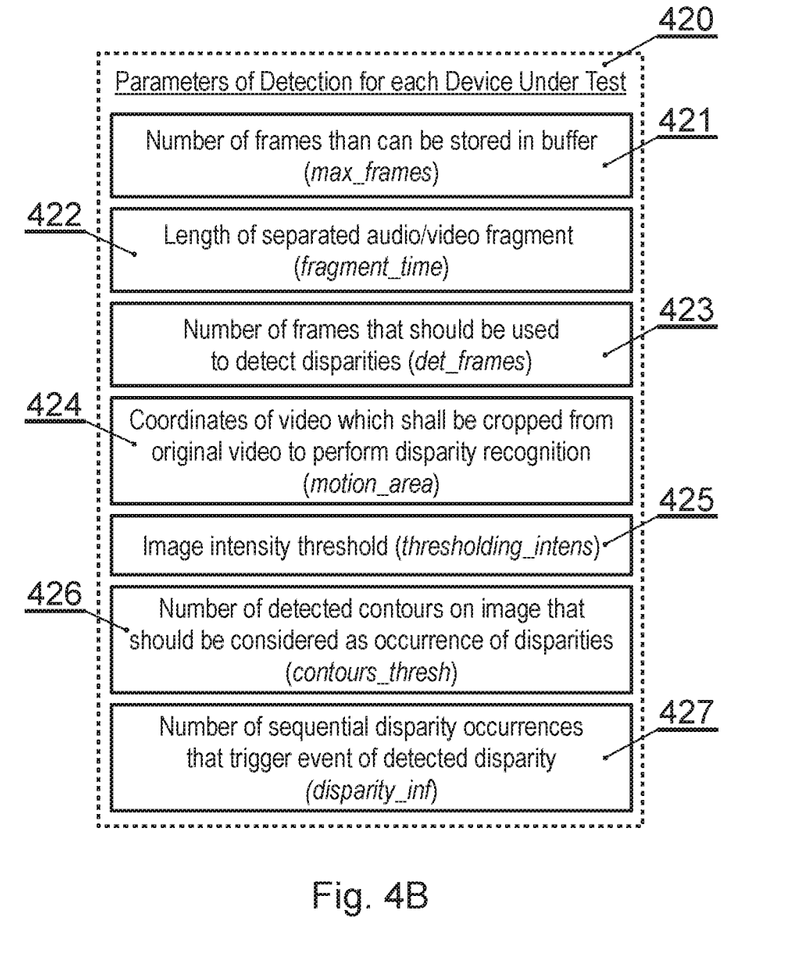

FIGS. 4A and 4B present data stored in the storage unit 220 of the personal computer 110. Data is stored in containers, such as tables or other data types.

A configuration block 401 comprises information concerning a list of devices under test 410 and parameters of detection for each device under test 420.

A temporary data block 430 comprises information concerning the currently processed audio/video data.

The block 420 with parameters of detection for each device under test comprises information concerning a number of frames that can be stored in a buffer (max_frames) 421, a length of separated audio/video fragment (fragment_time) 422, a number of frames that should be used for detecting disparities (det_frames) 423, coordinates of video which shall be cropped from original video to perform disparity recognition (motion_area) 424, an image intensity threshold (thresholding_intens) 425, a number of detected contours on image that should be considered as occurrence of disparities (contours_thresh) 426, a number of sequential disparity occurrences that trigger event of detected disparity (disparity_inf) 427.

Figure 5:
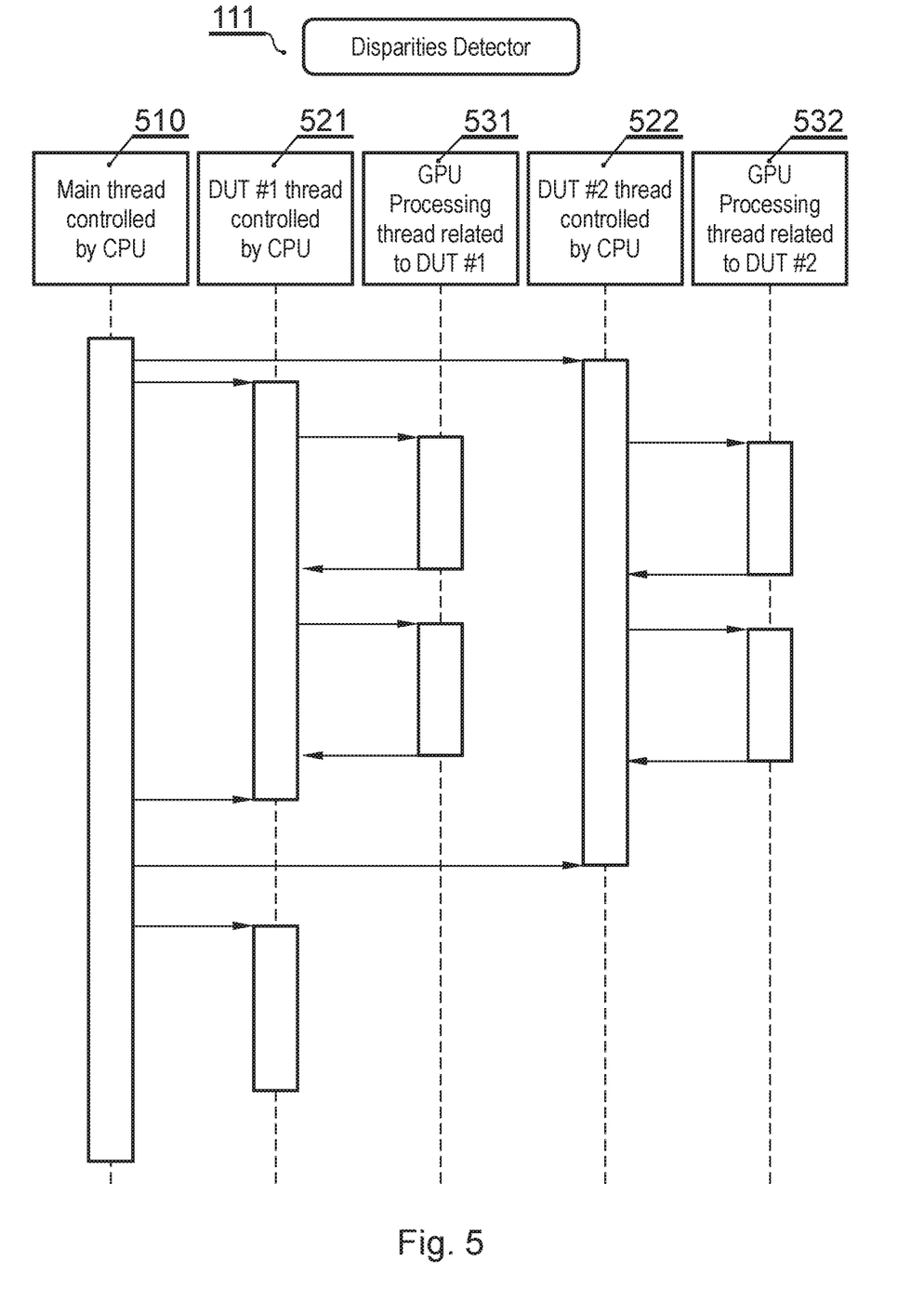
FIG. 5 presents disparities detector threads.

FIG. 5 presents threads of the disparities detector. The disparities detector 111 handles a single main managing thread 510 and separate CPU threads 521, 522 for each device responsible for processing its video frames. The CPU threads 521, 522 are controlled by the CPU. When new frames are acquired from the audio/video capture module 113 by the device thread, they are uploaded to the GPU memory and the GPU processes initializes GPU threads 531, 532 related to the DUT #1 and DUT #2 respectively. When the GPU operations are complete by the GPU thread, the CPU thread continues to order processing the next frame. The device thread pauses and resumes its operations when an alive flag is changed by the main thread.

Figure 6:
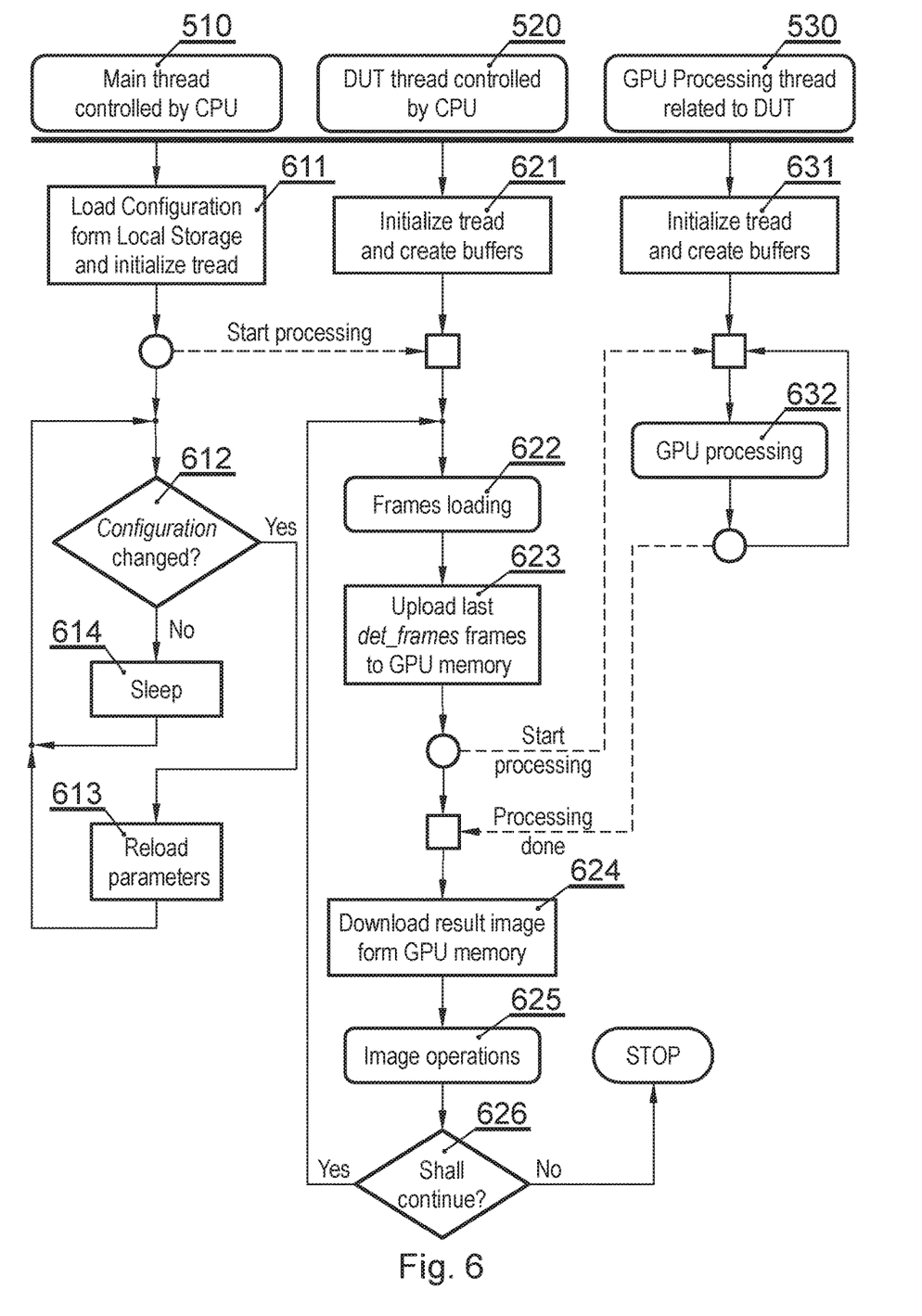
FIG. 6 presents a detailed flow of operations for a single device.

FIG. 6 presents a detailed flow of operations for a single device. After starting the main thread 510, a configuration is loaded from a local storage and the CPU thread 520 is initialized in step 611. Next, a routine is started which in step 612 checks if the configuration is changed. If so, then in step 613, all working threads parameters are reloaded and more threads are created if needed, and the routine loops back to step 612. If the configuration is not changed, then in step 614 the process waits and loops back to step 612.

After the CPU thread 520 is initialized in step 621, image frames are loaded in step 622. Next, in step 623 the last (det_frames) frames are uploaded to the GPU memory and the GPU processing is started in step 632 according to the GPU processing thread 530 related to the DUT which was initialized in step 631. When the GPU processing is finished (i.e. two frames are processed by the GPU) the result image is downloaded from GPU memory in step 624 and image operations are started in step 625 to determine if the result of the GPU computation shall be considered as occurrence of disparities between the frames. For example, step 625 may comprise checking whether the decoding process was interrupted, whether there are any errors (such as glitches) in the decoded stream, or whether there are any errors in a graphical user interface (such as shifting of images). Next in step 626 the process continues and loops back to step 622 or terminates at this point.

Figure 7:
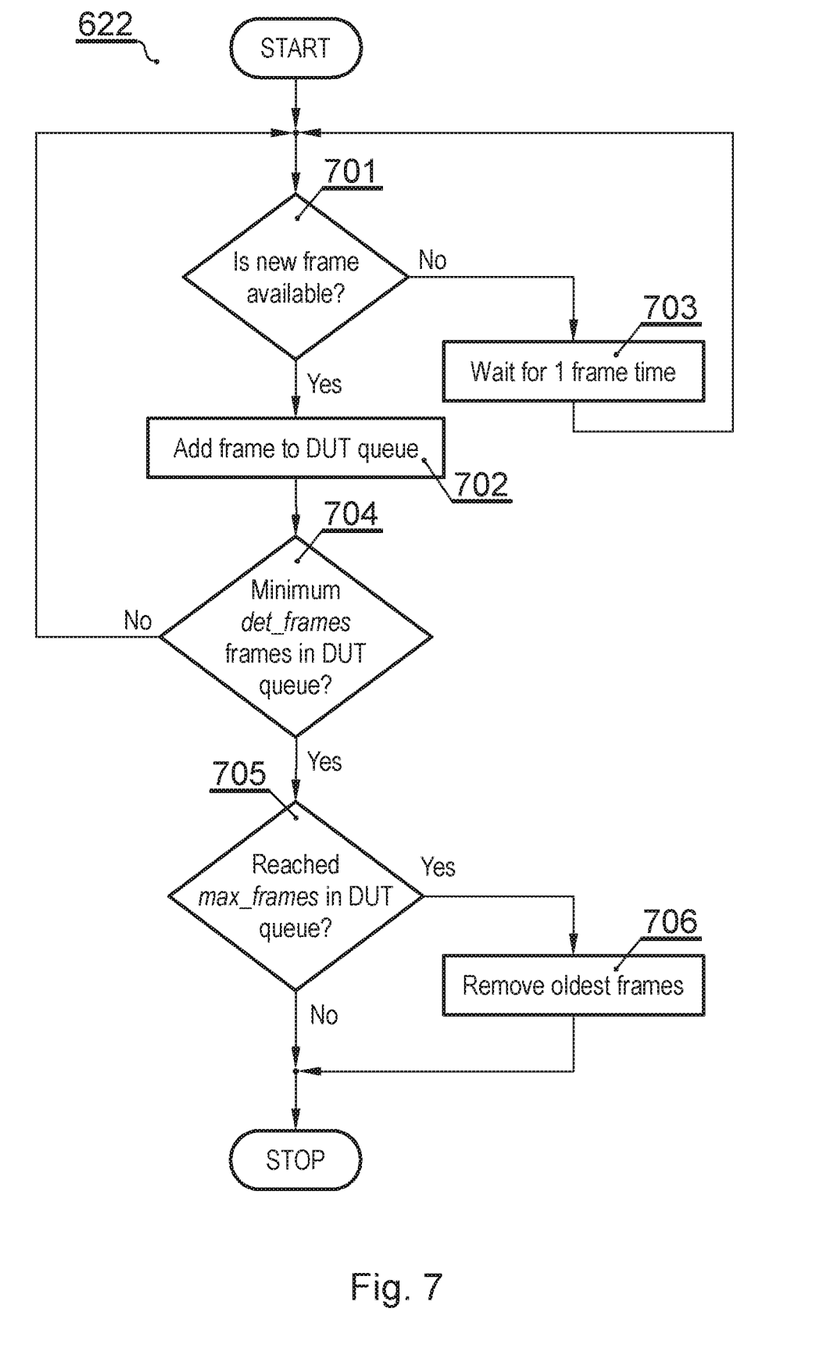
FIG. 7 presents details of a process of loading images.

FIG. 7 presents details of the process of loading images. In a first step 701 it is checked if a new frame is available, and if not, the process waits one frame time in step 703 and loops back to the first step 701. Otherwise, if a new frame is available, then the frame is added to a DUT queue in step 702. Next in step 704 it is checked if the minimum number of frames (det_frames) are present in the DUT queue. If not, then the process loops back to the first step 701. Otherwise, it continues to step 705 in which it is checked if the queue size is equal or bigger than the number of (max_frames) specified. If the number (max_frames) is reached, then in step 706 the oldest frames are removed. After queue is ready, the number of frames (det_frames) is uploaded to the GPU memory as further described in the process according to FIG. 6.

Figure 8:
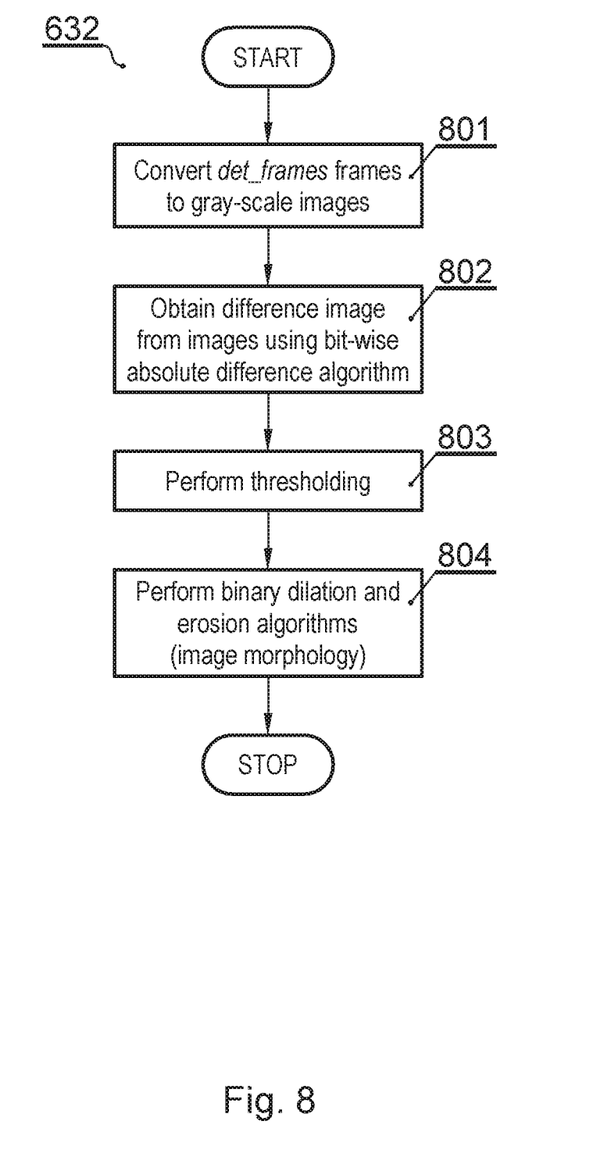
FIG. 8 presents details of a GPU processing.

FIG. 8 presents details of the GPU processing. The GPU processing 632 consists of four major operations which in result can detect disparities in sequential frames. In a first step 801 all (det_frames) frames are converted to grayscale images. Next in step 802 a difference image is created from all grayscaled images by means of a bit-wise absolute difference algorithm. Next, in step 803 a binary thresholding image segmentation is performed with (thresholding_intens) threshold to remove noise and filter out pixels with values smaller than (thresholding_intens). Next, in step 804 the result is applied with two iterations of dilation and one iteration of erosion algorithms using 3×3 rectangular structuring element to create more detectable contours of images disparities. When the processing is finished, the resulting image is downloaded from GPU memory and image operations are started.

Figure 9:
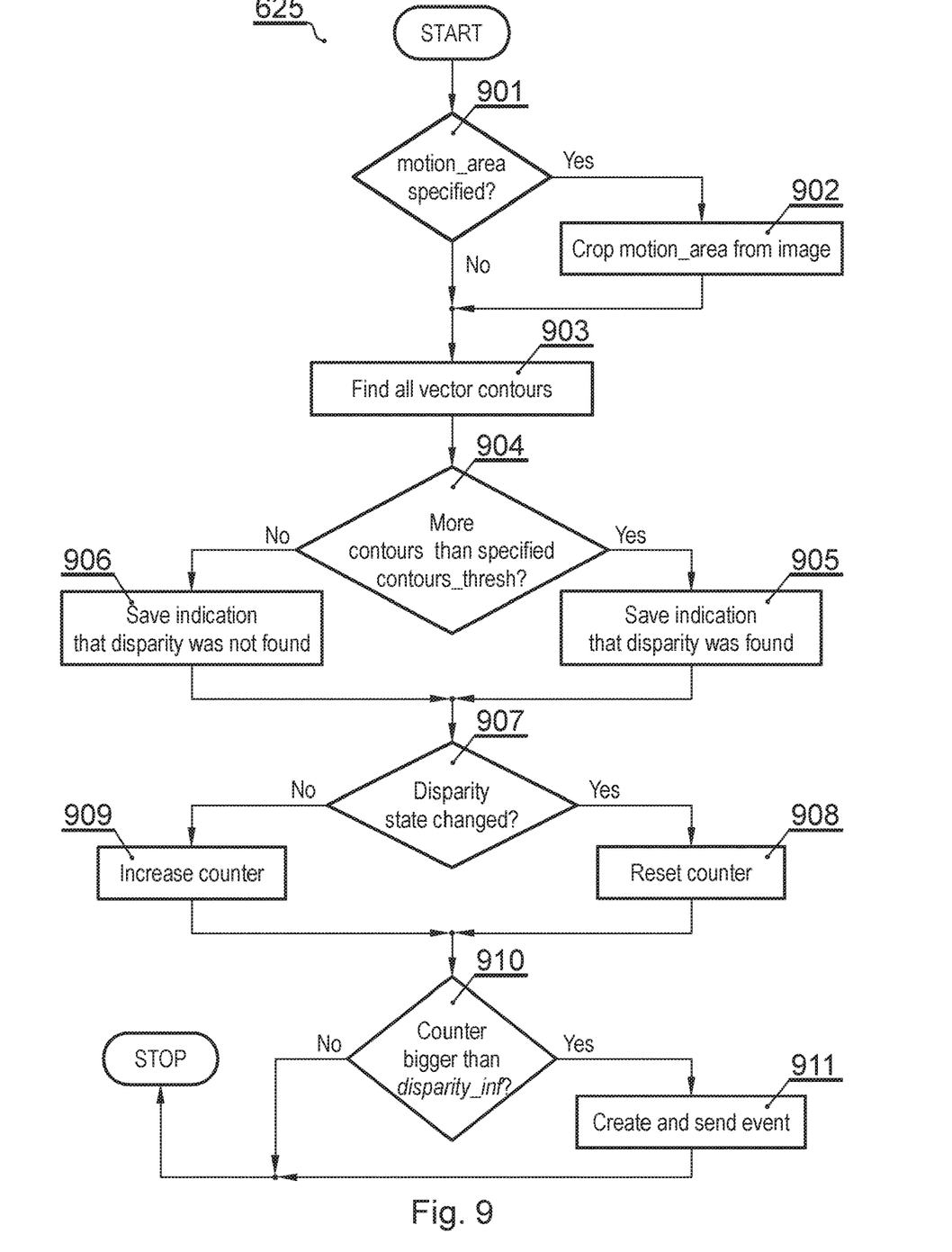
FIG. 9 presents details concerning image operations.

FIG. 9 presents details concerning image operations performed in step 622. In a first step 901 it is checked if a motion area is specified. If so, then in step 902 the motion area is cropped from the image in order to get only area of the image that is to be considered. Otherwise the process proceeds directly to step 903 in which all vector contours represented by non-black colors on the resulting image are found. Next in step 904 it is checked if the selected area contains more contours than the specified (contours_thresh). If not, then in step 906 the indication is stored that a disparity is not found. Otherwise, in step 905 it is stored that the disparity is found. Next in step 907 it is checked if a disparity state has changed (for example: no disparity in previous session and a disparity present in current one). If not, a disparity counter is increased in step 909, otherwise the disparity counter is reset in step 908. Next in step 910 it is checked if a number of sequential disparity occurrences is bigger than the specified (disparity_inf) number. If so, then in step 911 an event with information of disparities is created and sent to the events handler. Otherwise the procedure terminates.

Figure 10:
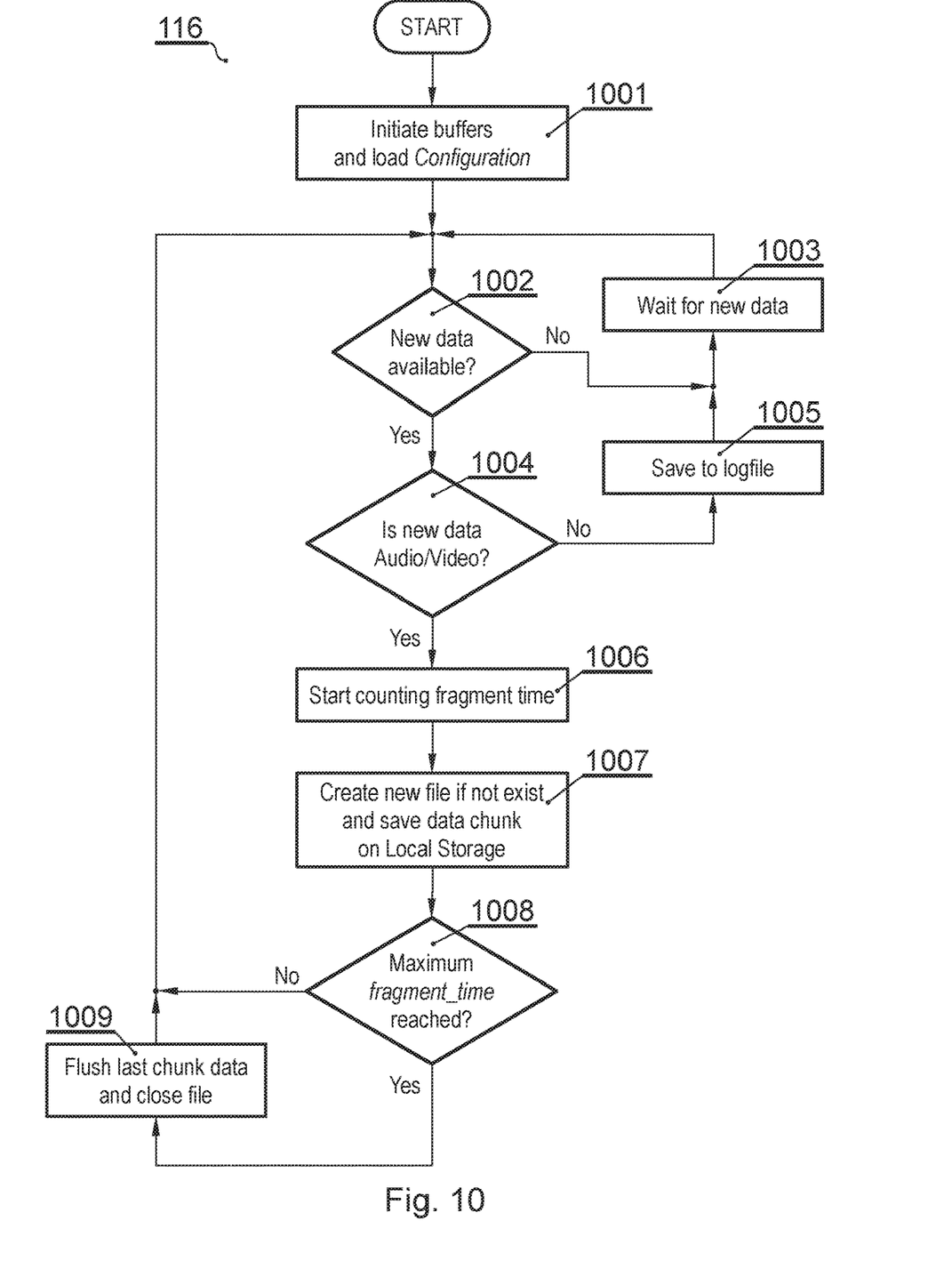
FIG. 10 presents a routine performed on a local storage.

FIG. 10 presents a routine performed on the local storage. In a first step 1001 the buffers are initialized, in order to prevent data loss in case the storage device is not ready, and the configuration is loaded from the disk device and stored in the memory. Next in step 1002 it is checked if new data are available. If not, then in step 1003 the routine waits for new data and loops back to step 1002. If new data is available, then in step 1004 it is checked if the new data are audio/video data. If not, it is saved to a logfile in step 1005. Otherwise, in step 1006 a new fragment timer is started and in step 1007 the new data chunk is saved to a new file (if the file didn't exist) and it is stored on the local storage. Next in step 1008 it is checked if a maximum time for a single fragment of data (fragment_time) is reached. If not, the procedure loops back to step 1002, otherwise it proceeds to step 1009 in which the last chunks are flushed to disk device. This mechanism is designed to prevent loss of data in case the process of saving data was interrupted. All audio/video data is encoded and interruption of the storage process could damage all data. In this case, only the last fragment will be damaged.

The present method allows particularly effective processing of high-resolution video streams from a plurality of DUTs using a device with a CPU and a GPU, due to effective division of tasks to threads operated by the CPU and the GPU. It allows running simultaneous tests on a plurality of devices, wherein various scenarios can be tested (such as testing different video signals, having different bitrates or resolutions). The method can effectively replace laborious testing procedures by a testing personnel and can allow detecting of small errors in the video processing which would be hardly noticeable to a testing person.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for parallel detection of disparities in a high resolution video from multiple devices may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A computer-implemented method for parallel detection of errors in video from multiple customer devices under test in a system unit that comprises a central processing unit and is connected to a graphics card with a graphics processing unit, the method comprising:
   receiving a video signal from each of the devices under test;
   processing each of the received video signals in a dedicated CPU thread controlled by the central processing unit and a dedicated GPU thread controlled by the graphics processing unit;
   wherein within the CPU thread successive threads are uploaded to a memory (244) for the graphics processing unit and the GPU thread is executed to process the frame, and the processed frames are collected from the memory for the graphics processing unit to check within the CPU thread whether errors in the video signal have occurred in the processed frame;
   wherein all the CPU threads are controlled by a main thread controlled by the central processing unit
   wherein an initialization of the main thread comprises:
      loading a configuration from a local storage and initializing a main thread;
      checking if the configuration has changed and if so, reloading parameters;
   wherein a processing of each CPU thread comprises:
      initializing the dedicated CPU thread for the device under test and creating buffers;
      loading successive image frames from the video signal of the device under test;
      uploading last (det_frames) frames to the memory for the graphics processing unit; initializing the dedicated GPU thread and creating buffers;
      processing the uploaded frames by the GPU thread;
      downloading a resulting image from the memory for the graphics processing unit;
      performing image operations within the CPU thread in order to detect errors in the video signal.

2. The method according to claim 1, wherein the loading of image frames comprises the steps of: checking if a new frame is available and if not, waiting one frame time and returning to step, and if so, adding the frame to a DUT queue; checking if a minimum of (det_frames) frames are present in the DUT queue and if not, returning to step, and if so, checking if a maximum number (max_frames) frames is reached in the DUT queue and if so, removing the oldest frames, and if not, terminating the process.

3. The method according to claim 1, wherein the processing of the uploaded frames at the GPU comprises the steps of:
   converting (det_frames) to gray-scale images;
   creating a difference image from the gray-scaled images;
   performing a binary thresholding image segmentation;
   performing a binary dilation and erosion algorithms.

4. The method according to claim 1, wherein performing the image operations comprises the steps of:
   checking if a motion area is specified if so, cropping the motion area from an image, and if not, finding all vector contours represented by non-black colors on the resulting image;
   checking if the selected area contains more contours than specified by (contours_thresh), and if so, storing an indication that an error was found, and if not, storing an indication that the error was not found;

checking if a disparity state has changed and if so, resetting a counter, and if not, increasing the counter;

checking if a number of sequential error occurrences represented by the counter is bigger than the specified (disparity_inf) number, and if so, creating an event with information of errors and sending the event to an events handler, and if not, terminating the process.

5. A computer-implemented system for parallel detection of errors in video from multiple customer devices under test, the system comprising a system unit that comprises a central processing unit and is connected to a graphics card with a graphics processing unit and memory, wherein the system is configured to perform the steps of:

receiving a video signal from each of the devices under test;

processing each of the received video signals in a dedicated CPU thread controlled by the central processing unit and a dedicated GPU thread controlled by the graphics processing unit;

wherein within the CPU thread successive threads are uploaded to a memory for the graphics processing unit and the GPU thread is executed to process the frame, and the processed frames are collected from the memory for the graphics processing unit to check within the CPU thread whether errors in the video signal have occurred in the processed frame;

wherein all the CPU threads are controlled by a main thread controlled by the central processing unit;

wherein an initialization of the main thread comprises:
 loading a configuration from a local storage and initializing a main thread;
 checking if the configuration has changed and if so, reloading parameters;

wherein a processing of each CPU thread comprises:
 initializing the dedicated CPU thread for the device under test and creating buffers;
 loading successive image frames from the video signal of the device under test;
 uploading last (det_frames) frames to the memory for the graphics processing unit; initializing the dedicated GPU thread and creating buffers;
 processing the uploaded frames by the GPU thread;
 downloading a resulting image from the memory for the graphics processing unit;
 performing image operations within the CPU thread in order to detect errors in the video signal.

6. A non-transitory computer readable medium storing computer-executable instructions performing all the following steps, when executed on a computer, comprising:

receiving a video signal from each of the devices under test;

processing each of the received video signals in a dedicated CPU thread controlled by the central processing unit and a dedicated GPU thread controlled by the graphics processing unit;

wherein within the CPU thread successive threads are uploaded to a memory for the graphics processing unit and the GPU thread is executed to process the frame, and the processed frames are collected from the memory for the graphics processing unit to check within the CPU thread whether errors in the video signal have occurred in the processed frame;

wherein all the CPU threads are controlled by a main thread controlled by the central processing unit;

wherein an initialization of the main thread comprises:
 loading a configuration from a local storage and initializing a main thread;
 checking if the configuration has changed and if so, reloading parameters;

wherein a processing of each CPU thread comprises:
 initializing the dedicated CPU thread for the device under test and creating buffers;
 loading successive image frames from the video signal of the device under test;
 uploading last (det_frames) frames to the memory for the graphics processing unit; initializing the dedicated GPU thread and creating buffers;
 processing the uploaded frames by the GPU thread;
 downloading a resulting image from the memory for the graphics processing unit;
 performing image operations within the CPU thread in order to detect errors in the video signal.

\* \* \* \* \*